United States Patent [19]

McCollum, Jr. et al.

[11] 4,259,838
[45] Apr. 7, 1981

[54] THROTTLE TRACKING IN MULTIENGINE AIRCRAFT

[75] Inventors: James H. McCollum, Jr.; Leo P. Kammerer, both of Cedar Rapids, Iowa

[73] Assignee: Rockwell International Corporation, El Segundo, Calif.

[21] Appl. No.: 52,167

[22] Filed: Jun. 26, 1979

[51] Int. Cl.³ .............................................. F02K 3/12
[52] U.S. Cl. .................................................... 60/224
[58] Field of Search ................ 60/224, 243; 244/182, 244/188, 196, 197; 364/431

[56] References Cited

U.S. PATENT DOCUMENTS

| | | | |
|---|---|---|---|
| 3,337,163 | 8/1967 | Frudenfeld | 244/197 |
| 3,362,661 | 1/1968 | Booth et al. | 244/182 |
| 3,852,956 | 12/1974 | Martin | 60/224 |
| 3,969,890 | 7/1976 | Nelson | 60/224 |

Primary Examiner—Robert E. Garrett
Attorney, Agent, or Firm—Edward A. Gerlaugh; Richard A. Bachand; H. Frederick Hamann

[57] ABSTRACT

A throttle servo for each engine of a multiengine aircraft and servo tracking means for detecting and compensating for servo drift during autothrottle mode of operation.

6 Claims, 6 Drawing Figures

THROTTLE TRACKING IN MULTIENGINE AIRCRAFT

The Government has rights in this invention pursuant to Contract No. DOT-CG-50152-A awarded by the U.S. Coast Guard.

BACKGROUND OF THE INVENTION

The invention relates to aircraft flight control systems, and, more particularly to automatic throttle-position tracking apparatus for multiengine aircraft.

Existing autothrottle systems which are used to drive two or more throttles utilize a single servomotor driving a mechanical clutch arrangement, which in turn, drives the several throttles. The clutch drives all of the throttles universally and equally in response to the servomotor input; however, each of the throttles may also be manually driven independently of each of the other throttles in response to a separate input to the clutch from each of several throttle control levers or handles, which handles are manipulable by the pilot of the aircraft. Each of the inputs to the clutch from the throttle control handles overrides, individually, the universal input from the servomotor. The throttles may thus be controlled individually by the pilot, or in unison by a flight control system through the servomotor input to the clutch.

The aforedescribed system has the disadvantage of requiring that the clutch mechanism and servomotor be located in the throttle quadrant of the aircraft cockpit. Such mechanical clutches are bulky and cumbersome, making access thereto difficult in the less than spacious environment of an aircraft cockpit. Further, lengthy mechanical linkages between the servo and the engine throttle mechanisms tend to introduce backlash and dead zones into the control loop, thus degrading loop performance.

When two or more rate servos are commanded together such as in a multiengine aircraft having an autothrottle system with a separate throttle servo for each engine, the servos will tend to drift and thus not maintain accurate positional relationship with respect to one another. Moreover, when commanded by the autothrottle system to advance or retard the throttles in synchronism, multiple servos also drift apart positionally with respect to one another because the integration rates are not precisely the same for all the servos. Since it is desirable to utilize rate servos in autothrottle applications, means must be provided for compensating for the aforementioned drift, thereby causing all the servos, and in turn the throttles and throttle handles, to act as if they were one. Otherwise stated, when the pilot manually positions the several throttle control handles to a desired positional alignment, each with respect to the others, and then activates the autothrottle mode of operation as by removing his hand from the throttle handles, the throttles must be advanced or retarded simultaneously and in unison by the servos in response to control signals from the autothrottle system, maintaining precisely the relative positional alignments originally established by the pilot.

SUMMARY OF THE INVENTION

It is a principal object of the invention to provide an improved autothrottle system for multiengine aircraft.

It is a more particular object of the invention to provide an improved autothrottle system for multiengine aircraft, which system is characterized by reduced weight and bulk of apparatus in the throttle quadrant of the cockpit.

Another object of the invention is to provide an improved autothrottle system for multiengine aircraft which significantly reduces backlash and dead zones characteristic of the prior art in the mechanical linkages between the throttle servo and the engine throttle mechanism.

Still another object of the invention is to provide an improved autothrottle system for multiengine aircraft having a separate throttle servo for each engine and including tracking means for compensating for drift inherent in the servos.

Yet another object of the invention is to provide an improved autothrottle system for multiengine aircraft having throttle tracking circuits utilizing multiplexed operation to reduce the number of circuits.

It is another object of the invention to provide an improved autothrottle system for multiengine aircraft, which system includes a separate throttle servo for each engine, servo tracking means for compensating for servo drift, and pressure sensitive switch means mounted on the cockpit throttle handles for disengaging the autothrottle system when the pilot manually adjusts the throttle handles.

In accordance with one aspect of the invention, a separate servo unit is provided for each engine of a multiengine aircraft. Each servo unit is coupled to the mechanical linkage between the throttle control handle in the cockpit and the throttle mechanism of the corresponding engine, at a location in or near the engine housing and remote from the throttle control handle. Each of the servos generates signals representative of the direction and magnitude of rotational displacement of the servomotor shaft from a selected starting point. Equalization circuit means responsive to the signals from at least two of the servos for throttle tracking, generates drive signals which are utilized to reposition the respective servomotors to their original relative positional alignment. A switch mounted on each of the throttle control handles, each switch being coupled to all of the servos, is responsive to the touch of the pilot to temporarily disengage the autothrottle system; each switch is coupled also to the equalization circuit means for establishing a reference of the relative positions of the throttle servos as set manually be the pilot, and, responsive to removal of the pilot's hand from the throttle handle, for reinitiating throttle tracking.

In accordance with a more detailed aspect of the invention, the rotational position signals generated by the throttle servos are pulsed digital signals of the type produced by an incremental encoder coupled to the shaft of the servomotor. The equalization circuit means comprises pulse conditioner and steering circuits which receive the pulsed digital signals from the throttle servos and in response thereto regenerate the servo pulses as inputs to an up/down counter. The counter is responsive to the signals coupled from the first servo to increment the count contained therein for one direction of rotation and to decrement the count for the opposite rotation; conversely, the counter is responsive to the signals from the second servo to decrement the count for the one direction of rotation and to increment the count for the opposite rotation. Thus the counter contains at any given instant a count or a number which is representative of the relative difference of rotational position of the two servos. The number in the counter is converted to an analog signal which is coupled to the respective servomotors, driving each relative to the other in a manner such as to restore them to their original relative positional alignment.

BRIEF DESCRIPTION OF THE DRAWING

The invention is pointed out with particularity in the appended claims; however, other objects and features will become more apparent and the invention itself will best be understood by referring to the following description and embodiments taken in conjunction with the accompanying drawing, in which:

DESCRIPTION OF THE PREFERRED EMBODIMENT

Figure 1:
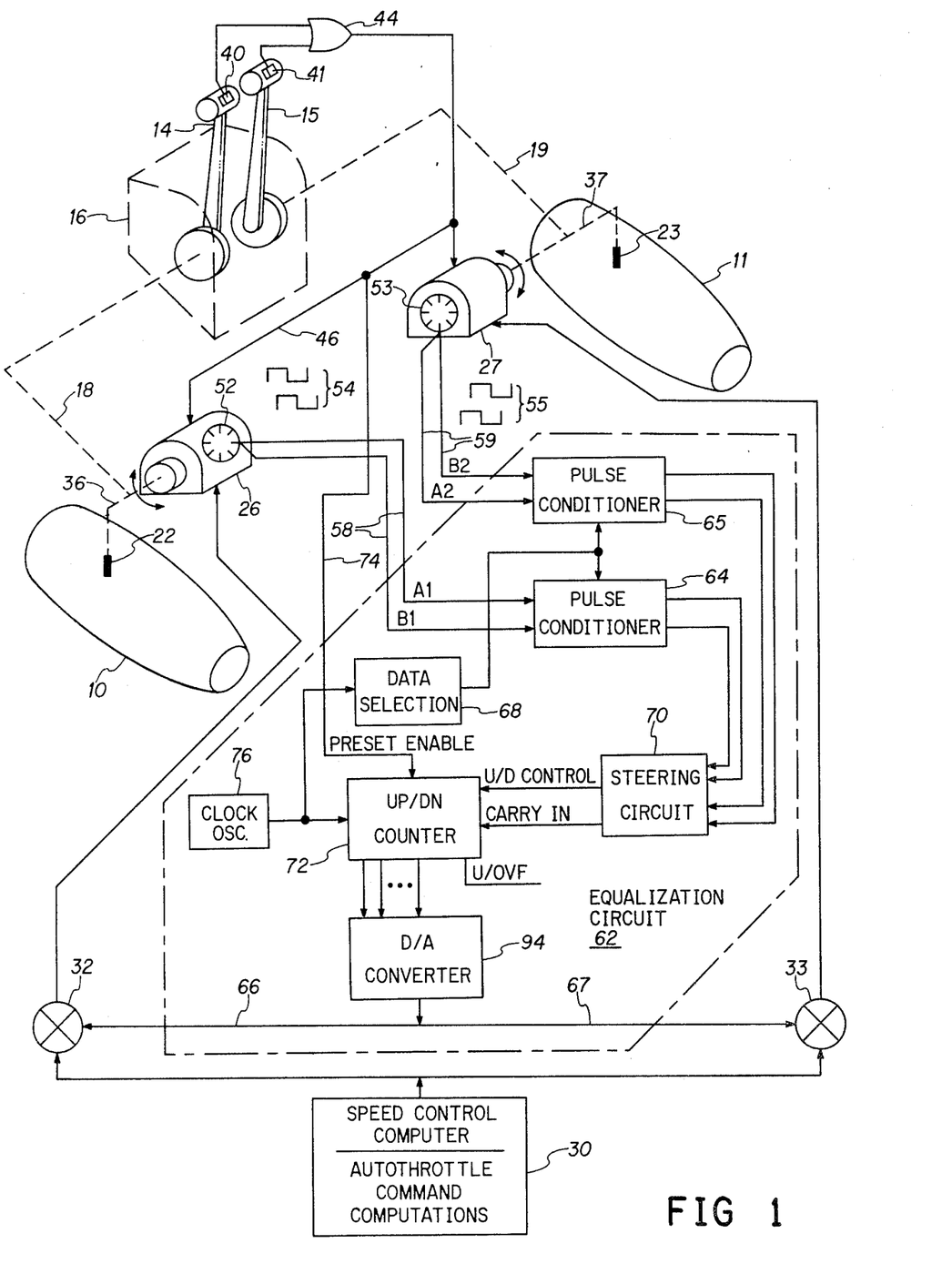
FIG. 1 is a functional block diagram of an improved autothrottle system in accordance with the instant invention.

Referring now to the various views of the drawing for a detailed description of the operation, construction and other features of the invention by characters of reference, FIG. 1 shows a diagram of a throttle control system of a multiengine aircraft. Associated with each of two engines 10, 11 of the aircraft are corresponding throttle control handles 14, 15 located in the throttle quadrant 16 of the aircraft cockpit. The throttle control handles 14, 15 are mechanically coupled by appropriate linkages 18, 19 to respective throttle mechanisms (not shown specifically, but indicated diagrammatically by reference numbers 22, 23) of the engines 10, 11. Coupled also in parallel between the engine throttles 22, 23 and the throttle control handles 14, 15 via the mechanical linkages 18, 19 are respective throttle servo units 26, 27, one for each of the engines 10, 11. A speed control computer 30 performs autothrottle command computations and generates outer loop control signals which are coupled via summing circuits 32, 33 to the throttle servo units 26, 27. The servos 26, 27 are responsive to the control signals from the speed control computer 30 by appropriate servomotor operation to advance or retard the engine throttles 22, 23 via those portions 36, 37 of the linkages 18, 19 between the servo units 26, 27 and the throttles 22, 23. Details of the mechanical linkages 18, 19 are not shown, but may be found in the literature and are quite familiar to those skilled in the art. Details of the operation of the flight control system including the speed control computer and the throttle servo loop generally are not required for a complete description of the instant invention even though these apparatus are peripherally germane to the invention. Such details also are published in the literature and are known to those skilled in art of aircraft flight control. Although the preferred embodiment of the invention is described with reference to a twin-engine aircraft, it is understood that the invention is applicable as well to aircraft having more than two engines.

The throttle servo units 26, 27 are each located in or near the respective engine 10, 11 housing and remote from the throttle control handles 14, 15. Such location of the servo units 26, 27 makes the linkage portions 36, 37 between the servos 26, 27 and the throttles 22, 23 extremely short when compared with the overall length of the linkages 18, 19, thereby significantly reducing any dead zones or backlash in the linkages 36, 37 and facilitating a commensurate improvement in the autothrottle system loop performance.

Figure 2:
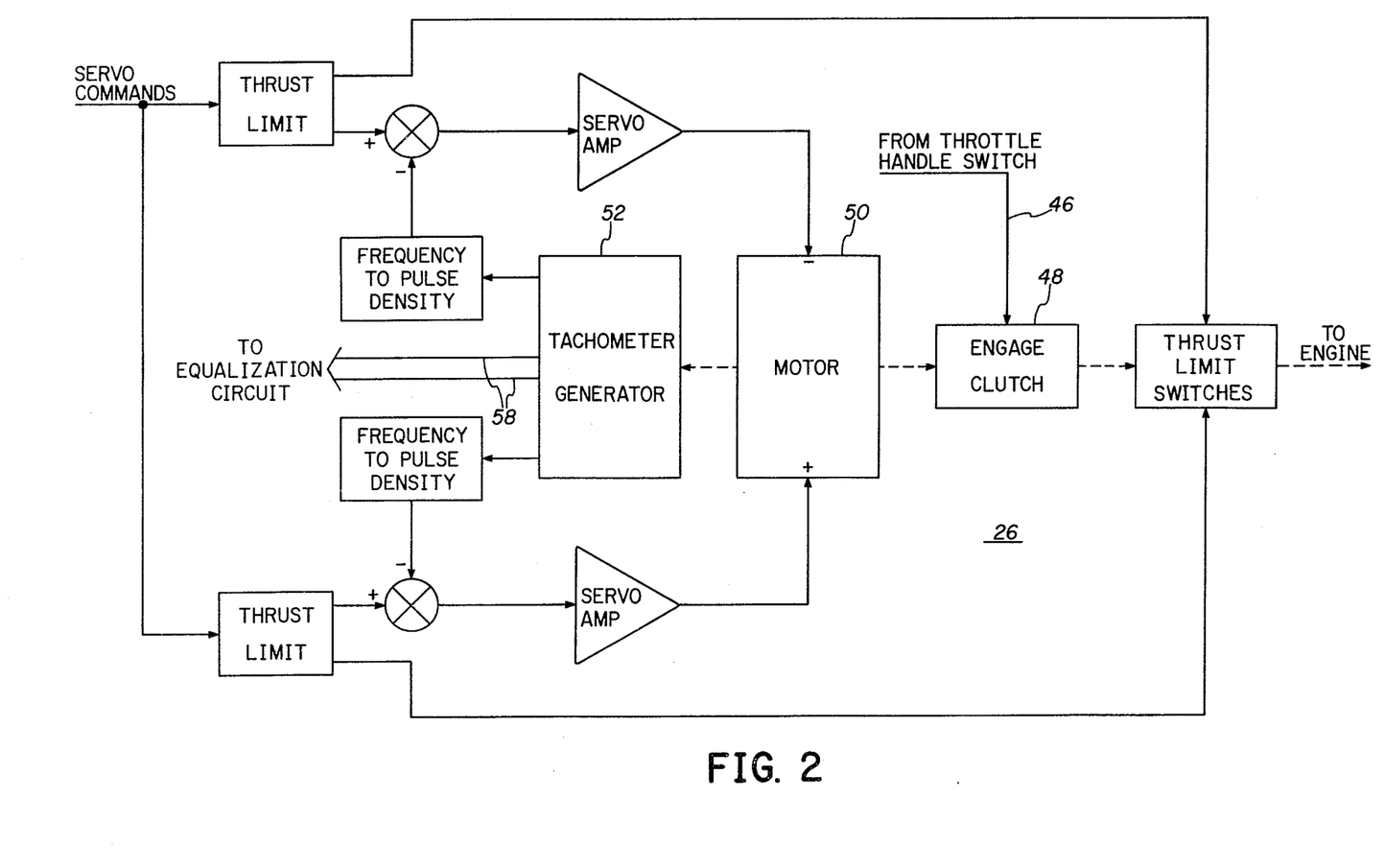
FIG. 2 is a detailed block diagram of a rate servo of the type which may be utilized in the practice of the present invention.

A switch 40, 41 is mounted in each of the throttle control handles. Each of the switches 40, 41 is responsive to a minimal pressure of the pilot's hand on the handle 14, 15 to actuate and supply a control signal via an OR logic element 44 and a lead 46 to each of the throttle servo units 26, 27. Referring briefly to FIG. 2, the servo unit illustrated is designated arbitrarily as the left servo unit 26 to facilitate the description. An engage clutch 48 of the servo unit 26 is responsive to the control signal received via the lead 46 to disengage servomotor 50 from the throttle linkage 36.

Referring now to FIGS. 1 and 2, a tachometer 52 is mechanically coupled to the servomotor 50 shaft. The tachometer 52 generates a signal 54 representative of the rate and direction of rotation of the servomotor 50. The tachometer 52 of the presently described embodiment is an incremental tachometer of the type which provides a fixed number of pulses for each revolution of the shaft, as for example by optoelectronic means. The signal 54 is generated as two pulse trains having the same repetition rates, but one pulse train shifted in phase by a predetermined amount with respect to the other in a direction, i.e., leading or lagging, depending on the direction of rotation or the servomotor 50. Incremental tachometers such as the tachometer 52 are known in the art and need not be described in detail herein. The pulse trains 54, 55 from each of the servos 26, 27 are coupled, respectively, via leads 58, 59, to an equalization circuit 62. The equalization circuit 62 in response to the pulsed signals 54, 55 received from the servo motors 26, 27, generates difference signals on leads 66, 67 which are representative of relative drift between the servos 26, 27. The difference signals are applied via the summing circuits 32, 33 to the servos 26, 27 which are responsive thereto to maintain the desired relative positional alignment between the servos 26, 27, while being at the same time responsive to outer loop control signals from the computer 30 to satisfy outer loop commands, as for example, for maintaining airspeed.

Referring still to FIG. 1, the tachometer pulse trains 54, 55 are regenerated by pulse conditioner circuits 64, 65, and under control of a multiplexer 68 the regenerated signals are coupled via a steering circuit 70 to an UP/DOWN counter 72. The counter 72 is responsive to the signals 54 to increment the count contained therein for a first direction of rotation of the servo 26 and to decrement the count for the opposite direction; conversely, the counter 72 is responsive to the signals 55 from the servo 27 to decrement the count for the first direction of rotation of the servo 27 (being the same direction as the first direction of the other servo 25) and to increment the count for the opposite direction of rotation.

The control signal from the sensors 40, 41 is applied via a lead 74 to a preset enable input of the counter 72. Actuation of either of the switches 40, 41 by the pilot causes the counter to be preset to a count which is in the middle of the range of the counter 72. The range of the counter 72 is selected such that underflow or overflow of the counter generates a U/OVF signal indicative of an anomaly in the equalization circuits or the autothrottle system. In any event the U/OVF signal is utilized to disable the autothrottle system and activate an appropriate sensory indication detectable by the pilot of the anomaly.

Figure 3A:
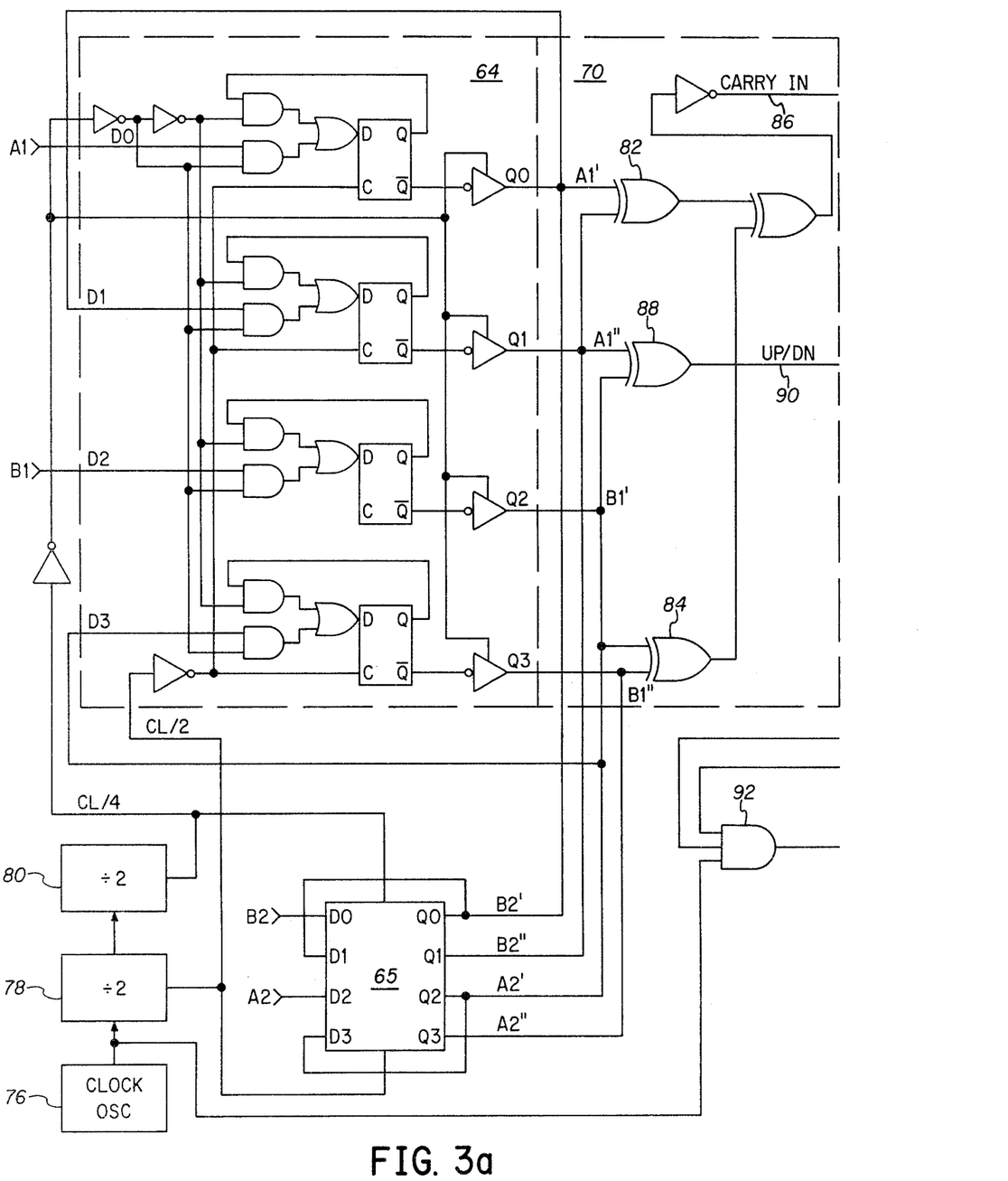
FIGS. 3A and 3B, when arranged side by side, form a logic diagram of the autothrottle system servo tracking circuits of the present invention.
Figure 3B:
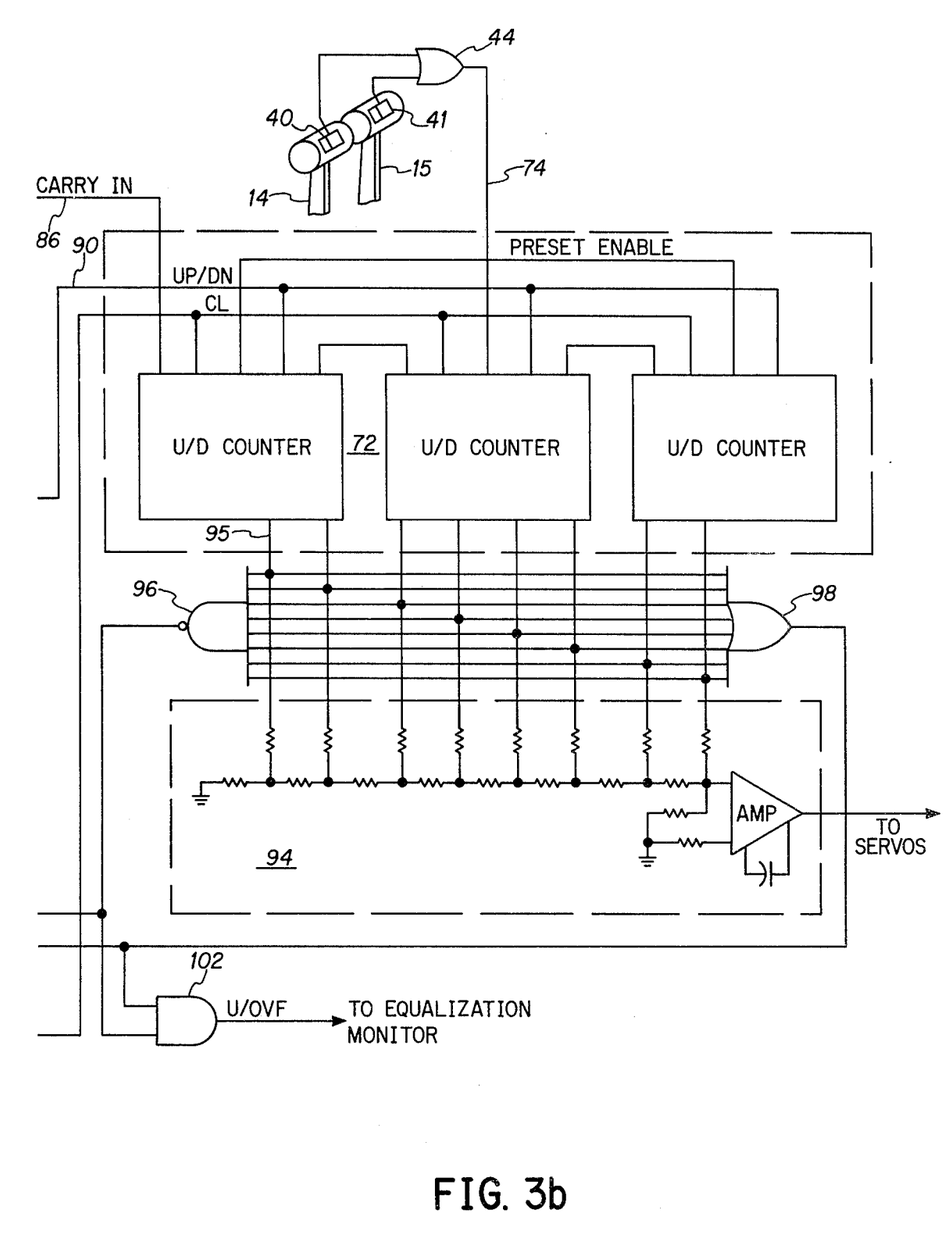

Referring now to FIG. 3 in conjunction with the timing diagrams of FIGS. 4 and 5, detailed operation of the equalization circuit 62 will now be described. A clock circuit 76 which may be an oscillator generates a clock signal CL the frequency of which is selected to be an appropriately large multiple of the maximum frequency of the tachometer output signals 54, 55 to provide adequate resolution of servomotor activity. In the presently described embodiment the clock frequency is 30 kHz. The clock signal CL is coupled successively through divide-by-two circuits 78, 80 which generate, respectively, clock signals CL/2 and CL/4. The divide-by-two circuits 78, 80 of FIG. 3A together form the data selection circuit 68 of FIG. 1. The pulse conditioner circuits 64, 65 are implemented with a commercially available 4-bit D-type bistable register having three state outputs, as for example, with integrated circuit part number MC14076B manufactured by Motorola.

Figure 4:
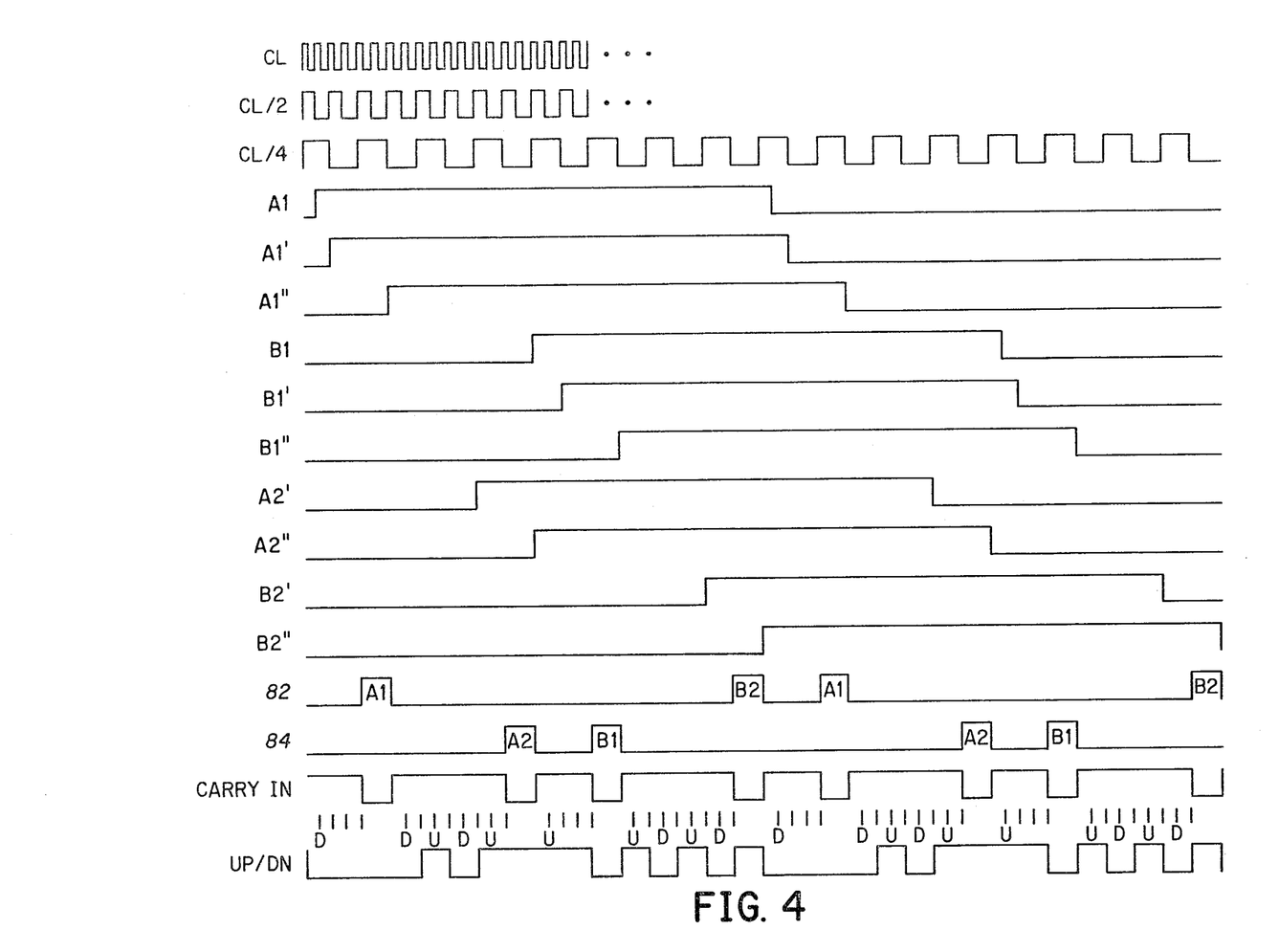
FIGS. 4 and 5 are timing diagrams showing signal waveforms generated in practicing the present invention.
Figure 5:
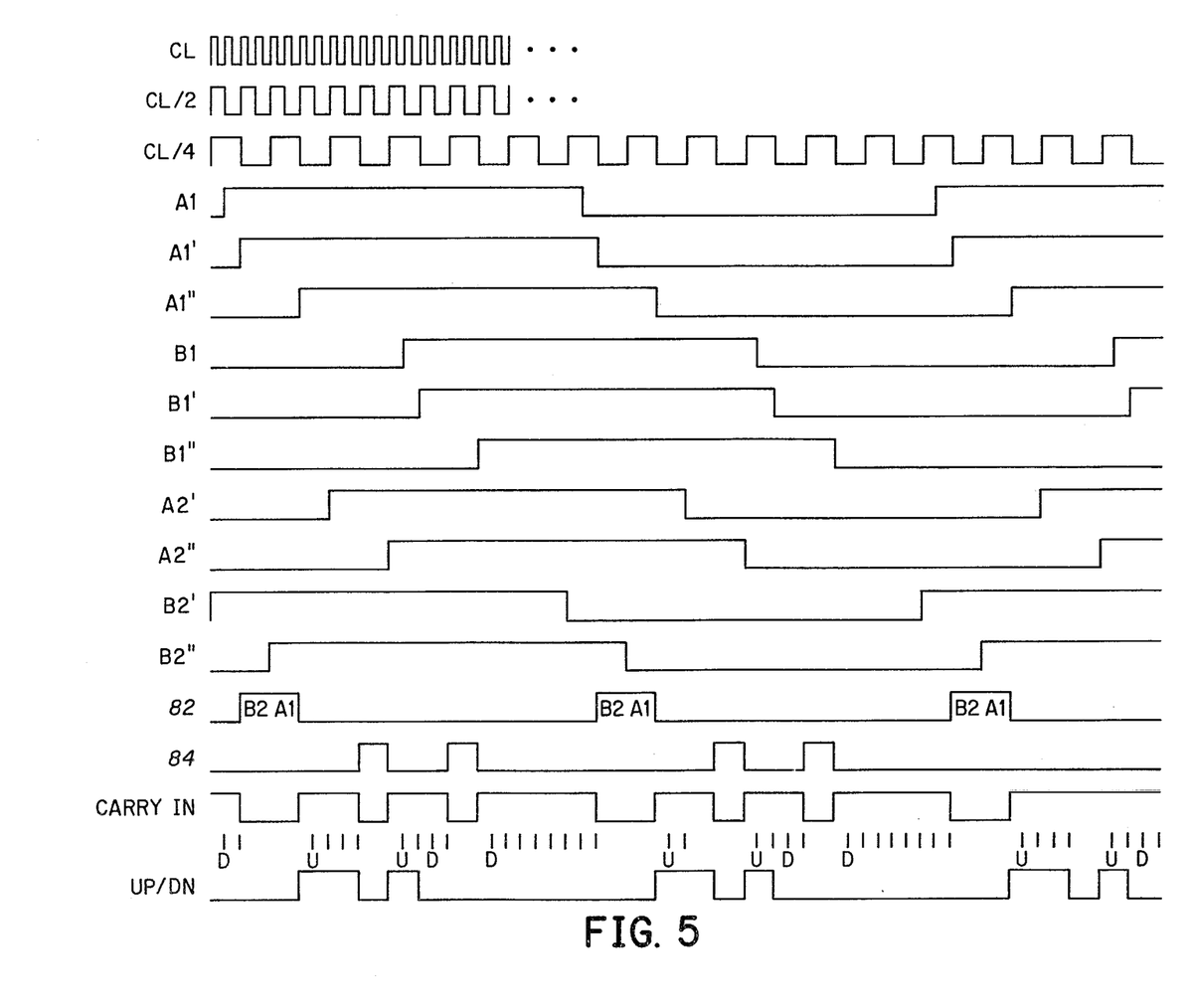

FIGS. 4 and 5 illustrate the clock signal CL and the data selection timing signals CL/2 and CL/4 derived therefrom in relation to the pulse trains 54, 55 from the respective throttle servo units. For illustrative purposes the signals 54 are labeled A1 and B1; the signals 55, A2 and B2. Signals derived or regenerated from the input signals are denoted with "prime" and "double prime" symbols added to the original signal symbol. It should be noted that the signals A1', A1"; B1', B1"; A2', A2"; B2', B2" illustrated in FIGS. 4 and 5 are representative of the Q outputs of the bistables of the pulse conditioner circuits 64, 65 and not the QO-4 outputs. The QO-4 outputs of the circuits 64, 65 are multiplexed under control of the CL/4 input signal and are each disabled for one half the CL4 period, the Qo-4 outputs of servo 1 pulse conditioner circuit 64 being disabled during the second half or negative portion of the CL/4 signal and the QO-4 outputs of the servo 2 pulse conditioner 65 being disabled during the first half or positive portion of the CL/4 period. Thus, for example, exclusive OR element 82 of the steering circuit 70 receives inputs Q0 and Q1 of servo 1 pulse conditioner 64 (derived, respectively, from signals A1' and A1") during the positive portion of the CL/4 signal period, and inputs Q0 and Q1 of servo 2 pulse conditioner 65 (derived, respectively, from signals B2' and B2") during the negative portion of the CL/4 signal period. The signals generated by exclusive OR logic elements 82, 84 are shown in FIGS. 4 and 5 for the given configurations of servomotor position signals. The source of the various pulses is designated on the waveforms. A CARRY IN signal on lead 86 is the inverted exclusive OR of the waveforms generated by the logic elements 82, 84 of the steering circuit 70. An exclusive OR logic element 88 generates an UP/DOWN control signal on lead 90 which is the exclusive OR function of the multiplexed input signals, viz.: UP/DOWN=(A1"+B2")⊕(B1'+A2'). The UP/DOWN and CARRY IN signals from the steering circuit 70 are coupled, respectively, via the leads 86, 90 to the UP/DOWN counter 72. The counter 72 may be implemented with commercially available integrated circuits such as, in the presently described embodiment, with presettable cascade up/down counter part number MC14516B manufactured by Motorola. The counter 72 is responsive to the UP/DOWN and CARRY IN signals when a clock enable logic element 92 is enabled to count at the clock signal CL rate as shown in FIGS. 4 and 5. The counter 72 counts up when the UP/DOWN and CARRY IN signals are enabled or high; the counter 72 counts down when the CARRY IN signal is enabled or high and the UP/DOWN signal is low. The counting is diagrammatically illustrated in FIGS. 4 and 5 by tick marks located between the CARRY IN and UP/DOWN signals, the counting mode for each group of successive counts being denoted by literal references D and U.

FIG. 4 illustrates the condition wherein each servo is drifting an equal amount in the same direction resulting in 24 up counts and 24 down counts. The count stored in the counter 72 thus remains at the preset number and no motor repositioning signals are generated. FIG. 5 shows the condition wherein the two servos are drifting at the same rate but in opposite directions, producing 20 up counts and 12 down counts, the resultant differential count of 8 being representative of the positional difference between the two servos. The digital number representative of a difference signal is detected in a ladder network 94 and converted to a repositioning or analog error signal in a manner well known in the art. The repositioning signal is utilized to command the servomotor which was advanced, to retard, and the servomotor which was retarded, to advance and thus move the servomotors relative to each other so as to restore them to their original relative positional alignment.

Force detectors 40, 41 located in the throttle control members or handles 14, 15 in the aircraft cockpit are responsive to the touch of the pilot's hand to generate a control signal on line 74, which signal presets the counter to a predetermined midrange count. In the presently described embodiment, all counter outputs except the most-significant bit output 95 are preset to logic "1".

The counter output signals are connected as inputs to a NAND logic element 96 which, when enabled by a full count, i.e., all logic "1"s output from the counter 72, serves to disable the clock enable logic element 92. An OR logic element 98 likewise provides an enabling signal to the clock enable circuit 92 whenever any count other than zero is stored in the counter 72. These logic elements 96, 98 and an AND logic element 102 comprise the underflow/overflow logic previously described with reference to FIG. 1. The AND circuit 102 supplies the U/OVF signal to equalization monitor circuits of the flight control system (not shown). The range of the counter is selected such that overflow or underflow will occur within predetermined acceptable limits for drift of the throttle servos. The actual count will vary among different aircraft; in the instant embodiment overflow or underflow of the counter occurs when throttle displacement due either to drift of the servos or some other anomaly reaches approximately 4.4 degrees of throttle.

Summarizing the operation of the present invention, when the autothrottle system is engaged by the aircraft pilot, the throttle servos are coupled to the engine throttles and the throttle handles in the cockpit through mechanical linkages. The pilot places his hand on the throttle handles to adjust them to a desired relative position; while the pilot's hand rests on or grasps the throttle handles, a control signal from force sensors in the handles disconnects the servos via engage clutches therein and presets an equalizaion circuit to establish a common reference of positions of the throttles. When the pilot's hand moves away from the throttle handles, the throttle servos are reengaged and the equalization circuits are enabled to perform throttle tracking. If the throttle servos should for any reason change their relative positional alignment, an error signal will be developed in the equalization circuits and converted to servo drive signals for reestablishing the original relative alignment of the servos.

It will be apparent to those skilled in the art that the disclosed throttle tracking apparatus for multiengine aircraft may be modified in numerous ways and may assume many embodiments other than the preferred form specifically set out and described above. For example, a similar result can be obtained if one servo is considered to be a master unit and the repositioning signal is coupled only to the other servo. This results in the other servo tracking the master servo in order to maintain the predetermined relative positional difference therebetween. The technique may also be employed where more than two servos must be made to track positionwise to compensate for drift. A differential count can be generated with respect to a master servo, and each additional servo with repositioning signals being used to command the respective servos to follow the master servo. Accordingly, it is intended by the appended claims to cover all modifications of the invention which fall within the true spirit and scope of the invention.

What is claimed is:

1. An improved throttle control system for an aircraft of the type having more than one engine and including means for automatically generating aircraft flight control signals; a throttle control member for each one of the engines, each of the throttle control members being manipulable by a pilot of the aircraft, each of the throttle control members being coupled mechanically by appropriate linkages to a throttle of a corresponding one of the engines; servo means responsive to the flight control signals received from the signal generating means for simultaneously via the linkages driving the throttles and the throttle control members; and means responsive to manipulation by the pilot of any one of the throttle control members for disengaging the servo means, wherein the improvement comprises:

said servo driving means including a throttle servo unit for each one of the engines of said aircraft, each of said throttle servo units being located near said one engine and remote from said throttle control member;

said disengaging means including a switch mounted on each of said throttle control members, each of said switches coupled to each of said throttle servo units; and equalization means coupled to at least two of said throttle servo units for detecting a relative difference of movement between said two throttle servo units, said equalization means further including means for generating a repositioning signal, at least one of said throttle servo units being responsive to the repositioning signal to reposition said at least one throttle servo unit, thereby cancelling the relative difference of movement between said at least two throttle servo units and correspondingly, reducing relative differences between the corresponding throttle settings and the positions of the corresponding throttle control members.

2. An improved throttle control system for an aircraft of the type having more than one engine and including means for automatically generating aircraft flight control signals; a throttle control member for each one of the engines, each of the throttle control members being manipulable by a pilot of the aircraft, each of the throttle control members being coupled mechanically by appropriate linkages to a throttle of a corresponding one of the engines; servo means responsive to the flight control signals received from the signal generating means for simultaneously via the linkages driving the throttles and the throttle control members; and means responsive to manipulation of any one of the throttle control members by the pilot for disengaging the servo means, wherein the improvement comprises:

said servo driving means including a throttle servo unit for each one of the engines of said aircraft, each of said throttle servo units including a throttle clutch, a motor mechanically coupled through the clutch to the linkages in parallel with said throttle control member and the throttle of the corresponding one of the engines, the motor and the clutch being located near said one engine and remote from said throttle control member, means coupled to a shaft of the motor for generating signals representative of the direction and magnitude of movement of the motor, and a motor drive circuit responsive to said flight control signals received from said signal generating means to generate a motor drive signal, the motor being responsive to the motor drive signal when the clutch is engaged to drive the linkages thereby changing the throttle setting of said one engine and moving said corresponding throttle control member;

said disengaging means including a switch mounted on each of said throttle control members, each of said switches electrically coupled to the throttle clutch of each of the throttle servo units, the clutch being responsive to the operation of said switch by the pilot to disengage the motor ffrom the linkages; and equalization means coupled to each of said throttle servo units and responsive to the direction and magnitude of movement signals received from the signal generating means therein when the throttle clutch is engaged for detecting relative differences of movement among the servo motors, said equalization means further including means responsive to said detecting means for generating motor repositioning signals, the motor drive circuits of said throttle servo units being further responsive to the repositioning signals to alter the motor drive signal to reposition the motor thereby cancelling the relative differences of movement among the motors and, correspondingly, reducing relative differences between the throttle settings and the positions of the throttle control members.

3. A throttle control system for a multiengine aircraft, comprising:

A. means for automatically generating aircraft flight control signals;

B. a throttle control member for each one of the engines of said multiengine aircraft, each of said control members being hand manipulable by a pilot of said aircraft, each of said control members being coupled mechanically by appropriate linkages to a throttle of a corresponding one of the engines;

C. a throttle servo unit for each of the engines of said multiengine aircraft, each of said throttle servo units including C1. a throttle clutch, C2. a motor mechanically coupled through the clutch to the linkages in parallel with said throttle control member and the throttle of the corresponding one of the engines, the motor and the clutch being located near said one engine and remote from said throttle control member, C3. means coupled to a shaft of the motor for generating signals representative of the direction and magnitude of movement of the motor, and C4. a motor drive circuit responsive to said flight control signals received from said signal generating means to generate a motor drive signal, the motor being responsive to the motor drive signal when the clutch is engaged to drive the linkages thereby changing the throttle setting of said one engine and moving said corresponding throttle control member;

D. a switch mounted on each of said throttle control members, each of said switches electrically coupled to the throttle clutch of all of the throttle servo units, the clutch being responsive to the operation of said switch by the pilot to disengage the motor from the linkages and reengage the motor upon release of said switch; and E. equalization means coupled to each of said throttle servo units and responsive to the direction and magnitude of movement signals received from the signal generating means therein when the throttle clutch is engaged for detecting a relative difference of movement among the motors, said equalization means further including means responsive to said detecting means for generating a motor repositioning signal, the motor drive circuit of each of said throttle servo units being further responsive to the repositioning signal to alter the motor drive signal to reposition the motor with respect to the other motors, thereby cancelling the relative differences of movement among the motors and, correspondingly, reducing relative differences of the throttle settings and the positions of the throttle control members.

4. The throttle control system as claimed in claim 1, 2, or 3 further comprising;

each of said switches electrically coupled to said equalization means, said equalization means further including means responsive to the operation of any one of said switches for establishing a common reference of positions of said servos when said one switch is operated to reengage the motor.

5. The throttle control system as claimed in claim 4 further comprising: said detecting means including a first pulse conditioner circuit receiving said direction and magnitude signals from said signal generating means of a first one of said motors;

a second pulse conditioner circuit receiving said direction and magnitude signals from a second one of said motors;

a pulse counter;

a steering circuit connected between said pulse conditioner circuits and said counter, said steering circuit receiving said direction and magnitude signals alternately multiplexed from said first and second pulse conditioner circuits, said steering circuit controlling said counter to increment when said first motor is rotating in a first direction, to decrement when said second motor is rotating in said first direction, to decrement when said first motor is rotating in a direction opposite said first direction and to increment when said second motor is rotating in said opposite direction, the frequency of incrementing and decrementing being proportional to the magnitude of movement of the respective motor, the resulting count of said pulse counter being representative of said relative difference of movement between said first and second motors.

6. A throttle control system for a multiengine aircraft, comprising:

A. means for automatically generating aircraft flight control signals;

B. a throttle control member for each one of the engines of said multiengine aircraft, each of said control members being hand manipulable by a pilot of said aircraft, each of said control members being coupled mechanically by appropriate linkages to a throttle of a corresponding one of the engines;

C. a throttle servo unit for each of the engines of said multiengine aircraft, each of said throttle servo units including C1. a throttle clutch, C2. a motor mechanically coupled through the clutch to the linkages in parallel with said throttle control member and the throttle of the corresponding one of the engines, the motor and the clutch being located near said one engine and remote from said throttle control member, C3. an encoder coupled to a shaft of the motor, said encoder generating a train of pulses representative of the direction and magnitude of movement of the motor, C4. a motor drive circuit responsive to said flight control signals received from said signal generating means to generate a motor drive signal, the motor being responsive to the motor drive signal when the clutch is engaged to drive the linkages, thereby changing the throttle setting of said one engine and moving said corresponding throttle control member;

D. a switch mounted on each of said throttle control members, each of said switches electrically coupled to the throttle clutch of all of the throttle servo units, the clutch being responsive to the operation of said switch by the pilot to disengage the motor from the linkages and reengage the motor upon release of said switch; and E. a throttle tracking circuit including E1. a first latch circuit receiving said train of pulses from the motor of a first one of said servo units, E2. a second latch circuit receiving said train of pulses from the motor of a second one of said servo units, E3. a counter circuit, E4. a pulse steering circuit receiving said pulse trains multiplexed alternately from said first and second latch circuits, said steering circuit controlling said counter circuit to increment when the motor of said first servo unit rotates in a first direction, to decrement when the motor of said second servo unit rotates in said first direction, to decrement when the motor of said first servo unit rotates in a direction opposite said first direction, and to increment when the motor of said second servo unit rotates in said opposite direction, said incrementing and decrementing occurring proportionally with the magnitude of rotation of said motors, said counter circuit generating an output count representative of a positional difference between said first and second motors from a reference position, said counter circuit being responsive to the operation of said switches on said throttle control members to preset to a predetermined count when said reference position is established manually, by said pilot and E5. means for converting said output count to a motor repositioning signal, the motor drive circuit of said first and second throttle servo units being further responsive to the repositioning signal to alter the motor drive signal and reposition the motors of said first and second servo units each with respect to the other to reestablish said reference position.

* * * * *